US011447147B2

(12) United States Patent
Subramanian et al.

(10) Patent No.: US 11,447,147 B2
(45) Date of Patent: Sep. 20, 2022

(54) SYSTEM AND METHOD TO DETECT DRIVER BEHAVIOR AND EMPLOY DRIVER INCENTIVES

(71) Applicant: DISH Network L.L.C., Englewood, CO (US)

(72) Inventors: Prakash Subramanian, Littleton, CO (US); Nicholas Newell, Centennial, CO (US); John Calef, Colorado Springs, CO (US); Ribhav Agarwal, Englewood, CO (US); Robert Laughlin, Brown Deer, WI (US); Matthew Xi, Rancho Cordova, CA (US)

(73) Assignee: DISH NETWORK L.L.C., Englewood, CO (US)

( * ) Notice: Subject to any disclaimer, the term of this patent is extended or adjusted under 35 U.S.C. 154(b) by 264 days.

(21) Appl. No.: 16/788,023

(22) Filed: Feb. 11, 2020

(65) Prior Publication Data

US 2021/0245775 A1 Aug. 12, 2021

(51) Int. Cl.
*B60W 50/14* (2020.01)
*B60W 40/09* (2012.01)

(52) U.S. Cl.
CPC ............ *B60W 50/14* (2013.01); *B60W 40/09* (2013.01); *B60W 2420/42* (2013.01); *B60W 2540/229* (2020.02)

(58) Field of Classification Search
CPC ...... B60W 40/08; B60W 40/09; B60W 50/08; B60W 50/10; B60W 50/14; B60W 2420/42; B60W 2420/403; B60W 2540/229; B60W 2552/10; B60W 2756/10; B60W 2554/4045; B60W 2554/4046; B60W 2554/4047; B60W 2554/4048; B60W 2554/4049; B60W 2555/60; B60W 2555/80; B60W 2556/45; B60W 2556/65; G06V 40/10; G06V 40/107; G06V 40/11;
(Continued)

(56) References Cited

U.S. PATENT DOCUMENTS 8,930,040 B2 * 1/2015 Gompert ................ G07C 5/085
701/1
9,393,868 B2 * 7/2016 Slaton .................... B60K 31/04
(Continued)

*Primary Examiner* — Russell Frejd
*Assistant Examiner* — Brandon Z Willis
(74) *Attorney, Agent, or Firm* — Seed IP Law Group LLP

(57) ABSTRACT

Embodiments are directed towards the interpretation of driver behavior and communication with autonomous vehicles and incentivizing drivers based on the driver's behavior. A computing device that sits on the dashboard of a vehicle includes at least one camera and circuitry. The computing device captures first images of the driver in the vehicle and second images of an area outside the vehicle. The computing device identifies another vehicle based on an analysis of the second images. The computing device determines a driving behavior of the driver based on an analysis of the first images. The computing device determines if the driving behavior satisfies a positive incentive threshold or a negative incentive threshold. The computing device selects and provides a positive or negative incentive to the driver in response to the driving behavior satisfying the positive incentive threshold or the negative incentive threshold, respectively.

19 Claims, 6 Drawing Sheets

(58) Field of Classification Search
CPC ...... G06V 40/113; G06V 40/16; G06V 40/18; G06V 40/20; G06V 40/28; G06V 20/56; G06V 20/59; G06V 20/58; G06V 20/597
See application file for complete search history.

(56) References Cited

U.S. PATENT DOCUMENTS

| | | | |
|---|---|---|---|
| 10,013,697 B1* | 7/2018 | Cote | G06Q 30/0208 |
| 10,407,078 B2* | 9/2019 | Ratnasingam | B60W 50/14 |
| 10,885,539 B1* | 1/2021 | Purgatorio | B60W 40/09 |
| 11,024,165 B2* | 6/2021 | Julian | G07C 5/0866 |
| 2019/0206253 A1* | 7/2019 | Amano | G08G 1/096791 |
| 2019/0329791 A1* | 10/2019 | Oba | B60W 50/12 |
| 2020/0057487 A1* | 2/2020 | Sicconi | G06T 7/136 |

* cited by examiner

SYSTEM AND METHOD TO DETECT DRIVER BEHAVIOR AND EMPLOY DRIVER INCENTIVES

TECHNICAL FIELD

The present disclosure relates generally to autonomous vehicle communication and, more particularly, to determining the behavior of a driver, communicating that behavior to other vehicles or drivers, and providing an incentive to the driver based on the driver's behavior.

BACKGROUND

Description of the Related Art

Autonomous vehicles, or self-driving vehicles, are starting to make their way onto public streets as sensor and image processing technologies improve. Autonomous vehicles generally employ an array of different cameras and sensors to detect the world around them and what other vehicles are doing. Autonomous vehicles use the information from these sensors and various rules, based on traffic laws and human reactions, to determine how to proceed or react to movement by other vehicles. Therefore, as the use of autonomous vehicles continues to increase, so too does the likelihood of interactions between autonomous vehicles and non-autonomous vehicles, especially at intersections.

As one example, when two vehicles approach a traffic intersection, one vehicle typically has the right of way and the other is to yield to the vehicle that has the right of way. If both vehicles are driven by humans, the humans can interact or observe subtle information from each other to determine how to proceed at the intersection. If one of the vehicles, however, is an autonomous vehicle then this interaction is greatly diminished, which can result in the autonomous vehicle and the human at a standstill as they both try to figure out what the other vehicle is doing. Moreover, some drivers may perform actions that extort the rules utilized by autonomous vehicle to cause the autonomous vehicle to operate in an erratic or unsafe manner. For example, a driver may continuously creep through an intersection to cause an autonomous vehicle to repeatedly stop as it reacts to the driver's behavior while proceeding through the intersection. It is with respect to these and other considerations that the embodiments described herein have been made.

BRIEF SUMMARY

Briefly described, embodiments are directed toward systems, methods, and devices that enable the interaction between human drivers and autonomous vehicles, e.g., at traffic intersections. When two vehicles are in proximity to one another, such as while driving down a road or when approaching a traffic intersection, a human driver of a first vehicle may gesture to a second vehicle to indicate that the driver will yield to the movement of the second vehicle to proceed, or that the driver is expecting the second vehicle to yield. Embodiments described herein capture images of the driver or images of the area outside the vehicle, or both, to determine the driver's driving behavior. The driving behavior is then utilized to determine if a positive incentive threshold or a negative incentive threshold is satisfied by the driver's behavior. If a threshold is satisfied, a positive or negative incentive is provided to the driver based on the satisfied threshold.

In some embodiments, the incentive or incentive threshold may be provided from the first vehicle to the second vehicle or to a third party. The second vehicle or the third party can respond by providing a corresponding incentive to the driver of the first vehicle. In other embodiments, the driving behavior may be provided to second vehicle (or other vehicles), whether by displaying a visual indicator (e.g., a red or green light) or by transmitting a wireless communication message. This interaction allows the second vehicle (whether an autonomous vehicle or another vehicle with a driver) to make an informed decision as to how to proceed through the traffic intersection based on what the driver of the first vehicle is doing. Conversely, in some embodiments, the behavior of the second vehicle is obtained and presented to the driver of the first vehicle. In this way, the driver of the first vehicle can understand what the second vehicle (whether an autonomous vehicle or another vehicle with a driver) is doing and make an informed decision for proceeding through the traffic intersection.

Utilization of the driving behavior and incentives improves the communications between drivers and autonomous vehicles, which results in enhanced driving safety.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

Figure 1:
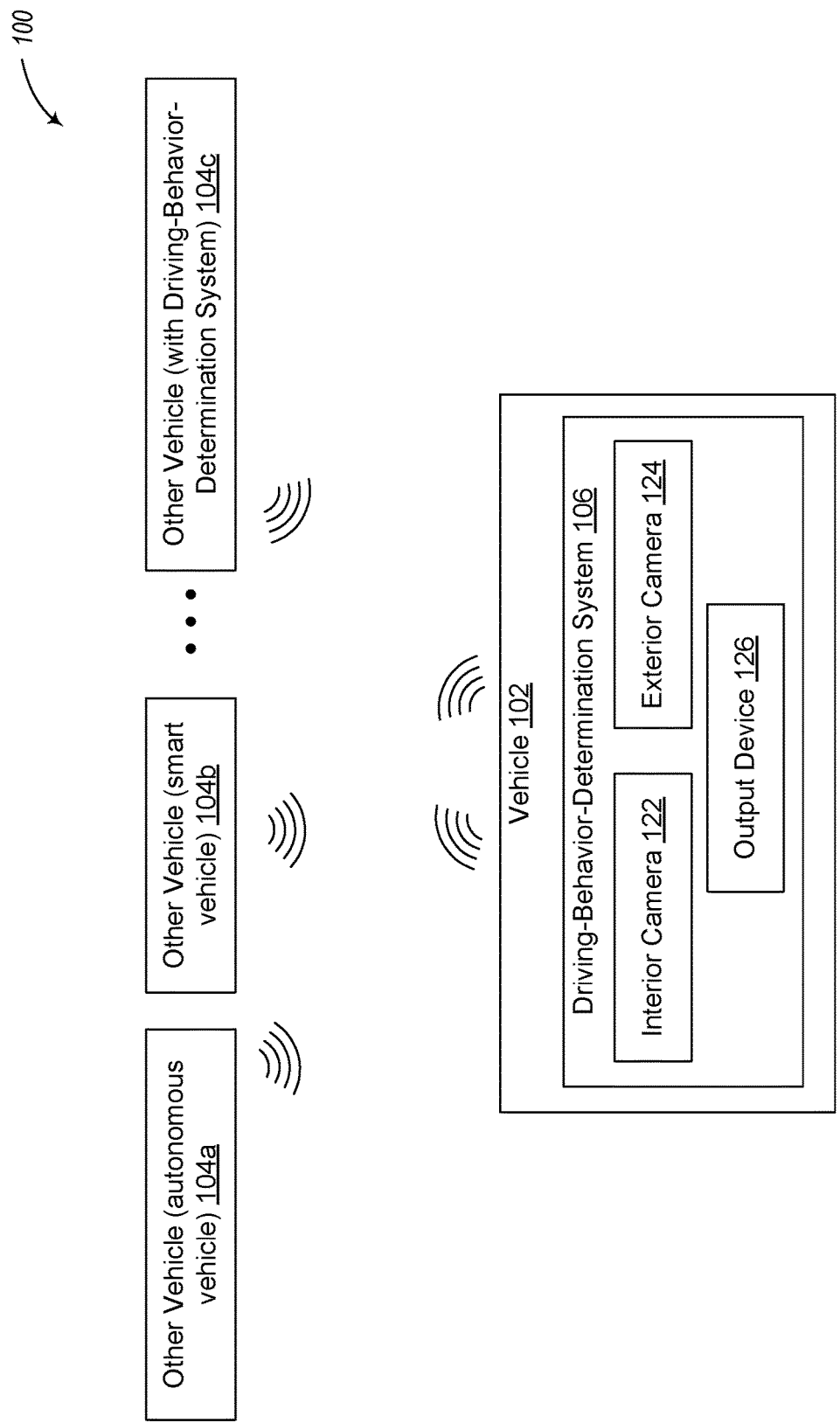
FIG. 1 illustrates a context diagram of an environment for determining driver behavior and communicating that behavior to other vehicles in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As used herein, the term "traffic intersection" refers to a location where two or more vehicles may interact with or be in proximity to one another. In some embodiments, traffic intersections may be where two or more roads, lanes, alleys, or vehicle passageways converge or intersect such that one vehicle may collide with another vehicle if one vehicle does not yield to the other. In other embodiments, traffic intersections may include areas of a highway where vehicles can pass one another (whether legally or illegally). Examples of traffic intersections include, but are not limited to, street intersections, roundabouts, parking lots, highway merging ramps, driveway entrances, highway passing lanes, multi-lane roads, etc.

As used herein, the term "vehicle" refers to a device that travels on roads, lanes, alleys, or other passageways to transport people or goods. Examples of vehicles include, but are not limited to, cars, trucks, tractor trailers, other automobiles, boats, buses, etc.

FIG. 1 illustrates a context diagram of an environment 100 for determining driver behavior and communicating that behavior to other vehicles in accordance with embodiments described herein. Environment 100 includes vehicle 102 and one or more other vehicles 104a-104c.

Vehicle 102 is a vehicle that includes a driving-behavior-determination system 106. The driving-behavior-determination system 106 utilizes exterior camera 124 to obtain images of an area outside of the vehicle 102, e.g., as the vehicle 102 is driving down a road or approaching a traffic intersection. These exterior images are analyzed by the driving-behavior-determination system 106 to identify characteristics of the road or traffic intersection, identify the other vehicles 104a-104c within proximity to the vehicle 102 or at the traffic intersection, etc.

The driving-behavior-determination system 106 utilizes interior camera 122 to capture images of the driver or user of the vehicle 102. These interior images are analyzed by the driving-behavior-determination system 106 to identify the driver's attention direction and hand movement and gestures. The driver's attention direction, hand movement and gestures, and traffic intersection characteristics is utilized by the driving-behavior-determination system 106 to determine a driving behavior of the driver of the vehicle 102. The driving behavior may be determined over a period of time (e.g., one minute, one hour, one week, etc.) or during an interaction with another vehicle (e.g., changing lanes in front of another vehicle, proceeding through a four-way stop, etc.).

Once the driving behavior of the driver is determined, the driving-behavior-determination system 106 determines whether to provide an incentive to the driver based on the driving behavior. The incentive may be positive or negative depending on the driving behavior. For example, if the vehicle approaches a four-way stop and the driver indicates, via a hand wave motion, for another vehicle to proceed through the intersection, then a positive incentive may be provided to the driver because the driver is operating the vehicle in a safe manner. But if the driver proceeds through the four-way stop without stopping or if the driver displays a vulgar gesture towards another driver, then a negative incentive may be provided to the driver because the driver is operating the vehicle in an unsafe manner.

In various embodiments, other actions or behaviors of the driver in response to the driving behavior may also be utilized. These other actions or behaviors may include further hand movements or gestures captured by the interior camera 122, movement of the vehicle (which may be captured via the exterior camera 124 or from sensors or computers on the vehicle 102), etc. For example, if the vehicle approaches a four-way stop and the driver indicates, via a hand wave motion, for another vehicle to proceed through the intersection first, but then cuts off the other vehicle, then a negative incentive may be provided to the driver.

In various embodiments, the driving-behavior-determination system 106 provides information regarding the driving behavior or incentives to the other vehicles 104a-104c via an output device 126. In some embodiments, the output device 126 may include visual display devices to present visual information indicating the driving behavior. In other embodiments, the output device may include wireless communication transmitters to transmit wireless messages with the driving behavior or incentive information to the other vehicles 104a-104c (e.g., via broadcast transmissions or point-to-point transmission). The driving-behavior-determination system 106 can obtain driving behavior or incentive information from the other vehicles 104a-104c and present that driving behavior or incentive to the driver of the vehicle 102 via the output device 126.

In various embodiments, the driving-behavior-determination systems of multiple vehicles may coordinate providing incentives to drivers. For example, if a first driving-behavior-determination system of a first vehicle determines that a driver of a second vehicle is to receive a positive incentive, then the first driving-behavior-determination system may send a positive incentive (e.g., audio content, coupons, or other positive incentives) to a second driver-behavior-determination system of the second vehicle. In this way, drivers can be incentivized to drive in a safe and proper manner, while also allowing drivers to thank drivers who are driving in a safe and proper manner.

The other vehicles 104a-104c may include autonomous vehicles 104a, smart vehicles 104b, or other vehicles with driving-behavior-determination system 104c that can send or receive wireless communication messages. Autonomous vehicles 104a include self-driving vehicles or other vehicles whose movement is being at least partially controlled by a computer. Smart vehicles 104b are vehicles driven by a person, but include computing components to communicate with other vehicles. The other vehicles 104c are under control of a human and are non-smart vehicles and non-autonomous vehicles, but include a driving-behavior-determination system. In some embodiments, the other vehicles 104a-104c provide or transmit the driving behavior of the other vehicle or its corresponding driver to the vehicle 102, as described herein. Although not illustrated, the other vehicles may also include human operated vehicles that do not have a driving-behavior-determination system, especially in situations where the driving-behavior-determination system 106 displays a visual indicator of the driver's behavior via output device 126. In various embodiments, other vehicles 104a-104c employ embodiments of the driving-behavior-determination system 106 described herein.

Figure 2:
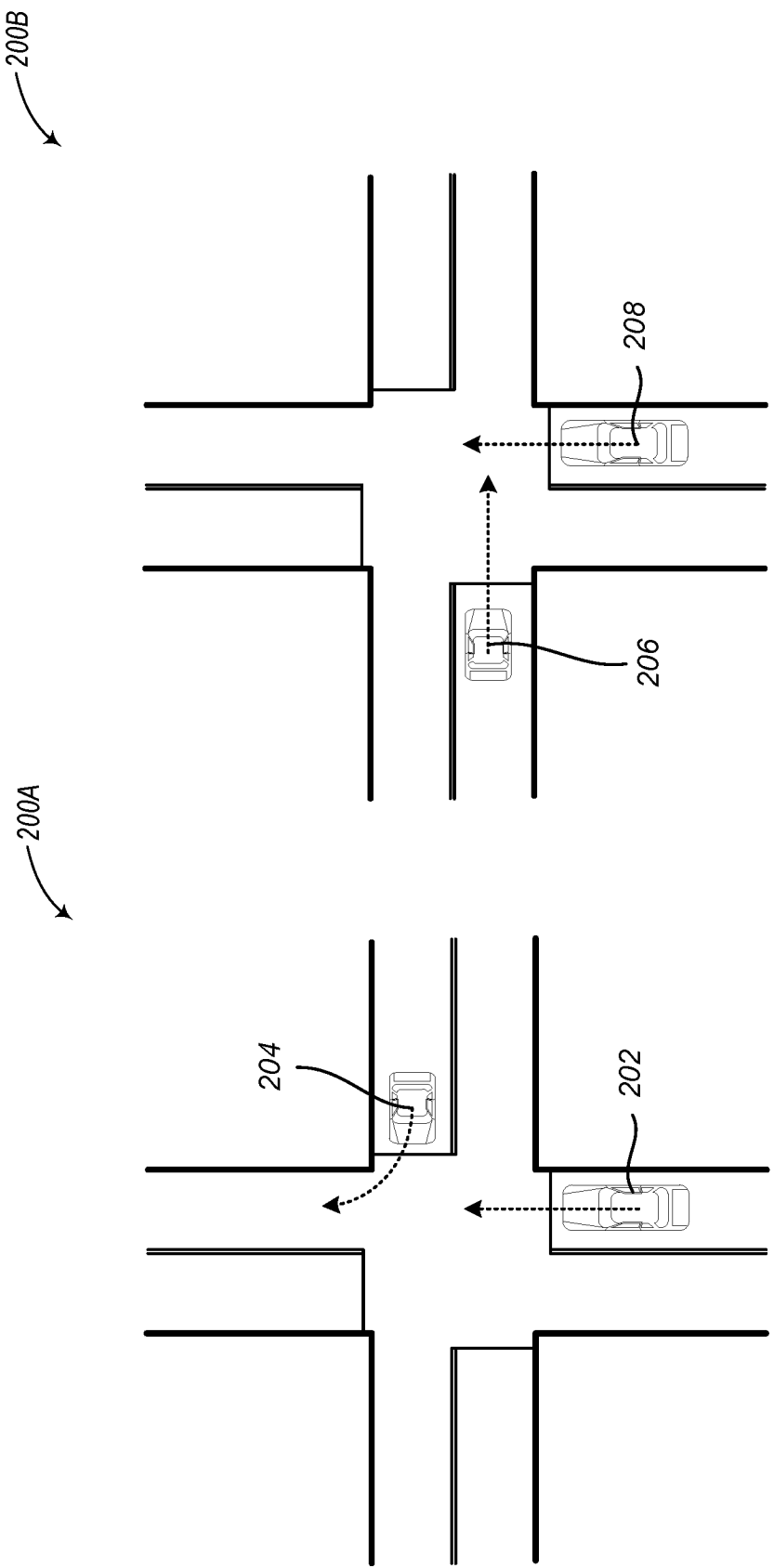
FIGS. 2A and 2B are example illustrations of driving scenarios where embodiments described herein may be utilized.

FIGS. 2A and 2B are example illustrations of driving scenarios where embodiments described herein may be utilized. FIG. 2A illustrates a traffic intersection 200A where a first vehicle 202 has arrived at the traffic intersection 200A at the same time as a second vehicle 204. In this example, the first vehicle 202 and the second vehicle 204 are embodiments of vehicle 102 in FIG. 1 with a driving-behavior-determination system.

The first vehicle 202 is intending to proceed straight through the traffic intersection 200A, and the second vehicle 204 is intending to turn right in front of the first vehicle 202. Even if the first vehicle 202 arrived at the traffic intersection 200A first and has the right of way, the driver of the first vehicle 202 may wave the second vehicle 204 to proceed first. If the second vehicle 204 is an autonomous vehicle and it applies traffic laws to determine which vehicle is to proceed first, it may wait for the first vehicle 202 to proceed through the traffic intersection 200A, even though the driver of the first vehicle 202 is indicating that the driver is waiting for the second vehicle 204.

By employing embodiments described herein, a driving-behavior-determination system in the first vehicle 202 captures images of the driver's wave and determines that the driver intents to wait. The driving-behavior-determination system in the first vehicle 202 provides this driving behavior to the driving-behavior-determination system in the second vehicle 204. The second vehicle 204 can then proceed through the traffic intersection 200A, followed by the first vehicle 202. In some embodiments, the driving-behavior-determination system in the first vehicle 202 may provide a positive incentive to the driver of the first vehicle 202, such as by providing a positive report to the driver's insurance company. In other embodiments, the driving-behavior-determination system in the second vehicle 204 may transmit a positive incentive, such as a song or coupon selected by the driver of the second vehicle 204, to driving-behavior-determination system of the first vehicle 202 to provide to the driver.

FIG. 2B is similar to FIG. 2A and illustrates a traffic intersection 200B where a first vehicle 208 has arrived at the traffic intersection 200B at the same time as a second vehicle 206. In this example, the first vehicle 208 is an embodiment of vehicle 102 in FIG. 1 with a driving-behavior-determination system, and the second vehicle 206 is an embodiment of vehicle 104 in FIG. 1.

The first vehicle 208 is intending to proceed straight through the traffic intersection 200B, and the second vehicle 206 is intending to proceed straight through the traffic intersection in front of the first vehicle 208. In this example, the second vehicle 206 may be an autonomous vehicle and determine that the first vehicle 208 is to proceed first. The first vehicle 208 includes a driving-behavior-determination system that captures images of the traffic intersection 200B and analyzes the images to identify the second vehicle 206 as an autonomous vehicle.

The driving-behavior-determination system in the first vehicle 208 also captures images of the driver waving the second vehicle 206 to proceed through the traffic intersection 200B. In response to this determination, the first vehicle 208 can transmit a wireless message to tell the second vehicle 206 to proceed first. If the second vehicle 206 begins to enter the traffic intersection 200B and the first vehicle 208 also begins to enter the traffic intersection 200B, then the autonomous second vehicle 206 may react by immediately stopping to prevent collisions. The driving-behavior-determination system in the first vehicle 208 can determine that this series of actions—waving the second vehicle 206 through the intersection then entering the intersection before the second vehicle 206 exits the intersection—is unsafe behavior and provide a negative incentive to the driver. In various embodiments, the hand movements, gestures, or waving, can be preset by an administrator, selected by a driver, or learned by an artificial intelligence model observing the driver's movements. The meaning of the driver's motions may dynamically change over time, which allows for a unique "sign language" that allows the drivers to communicate with one another or with autonomous vehicles.

In various embodiments, the rules of the road utilized by the driving-behavior-determination system may be generally identified from laws, social contracts of vehicles, social etiquette, etc. The driving-behavior-determination system may obtain these rules of the road by: requesting the rules from a government database of traffic laws and statutes (e.g., based on a current GPS location of the vehicle), learning the rules by using an artificial intelligence model observing the vehicle or other vehicle movements, crowdsourcing the rules from other driving-behavior-determination systems or autonomous vehicles in the vicinity, receiving driver selected inputs of the rules, or otherwise obtaining or requesting the rules from a centralized database.

In some embodiments, the particular rules to obtain may be determined based on a current location of the vehicle. The current location may be: input by the driver (e.g., a zip code), identified by a GPS system, identified using image recognition techniques on an area outside the vehicle (e.g., to identify the highest percentage of state license plates in the vicinity of the vehicle, identify "Welcome" signs of cities or states, identify city names from business or street signs, etc.). In at least one embodiment, new rules may be provided to the driving-behavior-determination system via a wireless transmission when the vehicle passes from one jurisdiction to another.

In various embodiments, drivers may opt in or opt out of receiving incentives. For example, a driver of a rental vehicle may opt in to receiving incentives, where positive incentives lower the cost of the vehicle, but negative incentives increase the cost of the vehicle. In some embodiments, the opt in or opt out ability of a driver may also be specified for a specific time of day or time period. For example, if an employee uses a personal vehicle for work, the driver may opt in during work hours but may opt out after work hours.

In this way, the employer can track the driver's behavior and provide positive or negative incentives to the employee during work hours, but does not track the driver's behavior after hours.

The following are various other scenarios of positive behaviors and incentives that can be provided to a driver.

Scenario 1: Maria is a safe and responsible driver. She always lets people pass her and gestures to other drivers to pass when she's driving the speed limit. Maria also never drives impaired. Embodiments described herein detect this positive behavior and she gets a deductible on her insurance plan as a result of her safe driving.

Scenario 2: Jennifer's autonomous vehicle and John are waiting for a train to pass. After the train has passed, John signaling for Jennifer to go first. A system on Jennifer's autonomous vehicle employs embodiments described herein and detects this positive behavior and Jennifer's autonomous vehicle transfers a song to John (e.g., to John's vehicle or to an online profile maintained for John).

Scenario 3: Frank's partner is pregnant and her water broke in the vehicle. The drive to the hospital is normally 30 minutes. Frank signals that there is an emergency and the system in his vehicle transmits emergency messages to other nearby vehicles and to other vehicles employing embodiments described herein. Sally is on her way to work and she typically uses the same route that Frank is using to get to the hospital (e.g., by tracking historical movement of Sally's vehicle). Sally give Frank right of way by modifying her route to avoid Frank. Embodiments described herein detect this positive behavior and Sally receives a gift from Frank.

Scenario 4: Jessica is driving on the road and encounters an autonomous delivery vehicle for the 100th time. Jessica has had 100 positive interactions with autonomous delivery vehicles from the same company by giving them the right of way. Jessica's driving profile logs each of these encounters. Her profile also has a wishlist of products from the same company. Embodiments described herein detect when Jessica's positive behavior satisfies a positive incentive threshold, and the company delivers a gift from her wishlist to her (e.g., by delivery the gift to Jessica's house or through the sunroof of Jessica's vehicle.

Positive incentives can generally be services, delivery of items, products, information, IOUs ("I Owe You"), charity donations, etc. Examples of positive incentive services may include: receiving right of way from an autonomous vehicle even though the autonomous vehicle has right of way, an autonomous vehicle provides a vehicle escort services that drives in front of you leading you to your destination, providing or receiving specialized services from the driver of another vehicle (e.g., doctor, haircut, dog walker, vehicle technician), or other services. Examples of positive incentive deliveries may include: transferring charge from one electric vehicle (e.g., an autonomous electric vehicle) to another electric vehicle (e.g., a human driven electric vehicle), receiving a product from an autonomous delivery truck while in route, receiving a delivery package before the projected arrival date, etc. Examples of positive incentive products may include: receiving money for relinquishing right of way, receiving music or a playlist created by the owner of the another vehicle, receiving coupons another vehicle owner has that are about to expire or that can be redeemed at nearby locations, receiving a tool or other assistance to fix a future flat tire or breakdown on the road, providing discounts from insurance companies, providing physical products from a business, etc. Examples of positive incentive information may include: being notified of sports games or other factors nearby causing traffic delays, receive notices of police officers further down the road, receiving information regarding vehicle accidents or weather ahead, etc. An example of a positive incentive IOU may be exchanging information between the vehicles of the positive encounter such that when the vehicles encounter one another at a future date at the same location as the positive encounter (or within a threshold distance from the positive encounter or at some other location), some other positive incentive is provided at that time. An example of a positive incentive charity may include a driver selecting a charity that receives that driver's positive incentives instead of the driver themselves.

The following are various other scenarios of negative behaviors where negative incentives are provided to a driver.

Scenario 1: Jeff is driving a non-autonomous vehicle on the highway and wants to experiment with the limits of autonomous vehicles. Jeff keeps merging right in front of an autonomous vehicle no matter where the autonomous vehicle is, effectively "cutting them off." Embodiments described herein detect this negative behavior and Jeff's insurance price is raised as a negative incentive indicating he has demonstrated unsafe driving behavior.

Scenario 2: Joe bullies an autonomous vehicle that has the right of way by choosing to go first or taking advantage of safety protocols of autonomous vehicles by brake checking/swerving/tailgating/driving unusually slow, etc. Embodiments described herein detect this negative behavior and provide a negative incentive to Joe.

Scenario 3: Kim takes advantage of video recognition processes of autonomous vehicles in an attempt to cause the autonomous vehicle to crash or drive erratically. For example, Kim may utilize flashing lights to mimic an emergency vehicle, flash lights that blind or impair the camera sensor, intentionally build up and release smog to "blind" the autonomous vehicle; put a stop sign on back of a vehicle to keep autonomous vehicles from moving, place decals or large photos of animals (domestic pets such as dogs, or wildlife such as deer) on her vehicle to convince an autonomous vehicle's logic into stopping, etc. Embodiments described herein detect this negative behavior and provide a negative incentive to Kim.

Scenario 4: Katie continuously "boxes in" or does not move out of the way of another vehicle causing an unsafe driving condition. Embodiments described herein detect this negative behavior and provide a negative incentive to Katie.

Negative incentives can generally be loss of money or credits, increases or changes in insurance premiums or policies, removal of previous received positive incentives, etc.

The operation of certain aspects will now be described with respect to FIGS. 3-5. In at least one of various embodiments, processes 300, 400, and 500 described in conjunction with FIGS. 3-5, respectively, may be implemented by one or more processors or executed via circuitry on one or more computing devices, such as driving-behavior-determination system 106 in FIG. 1.

Figure 3:
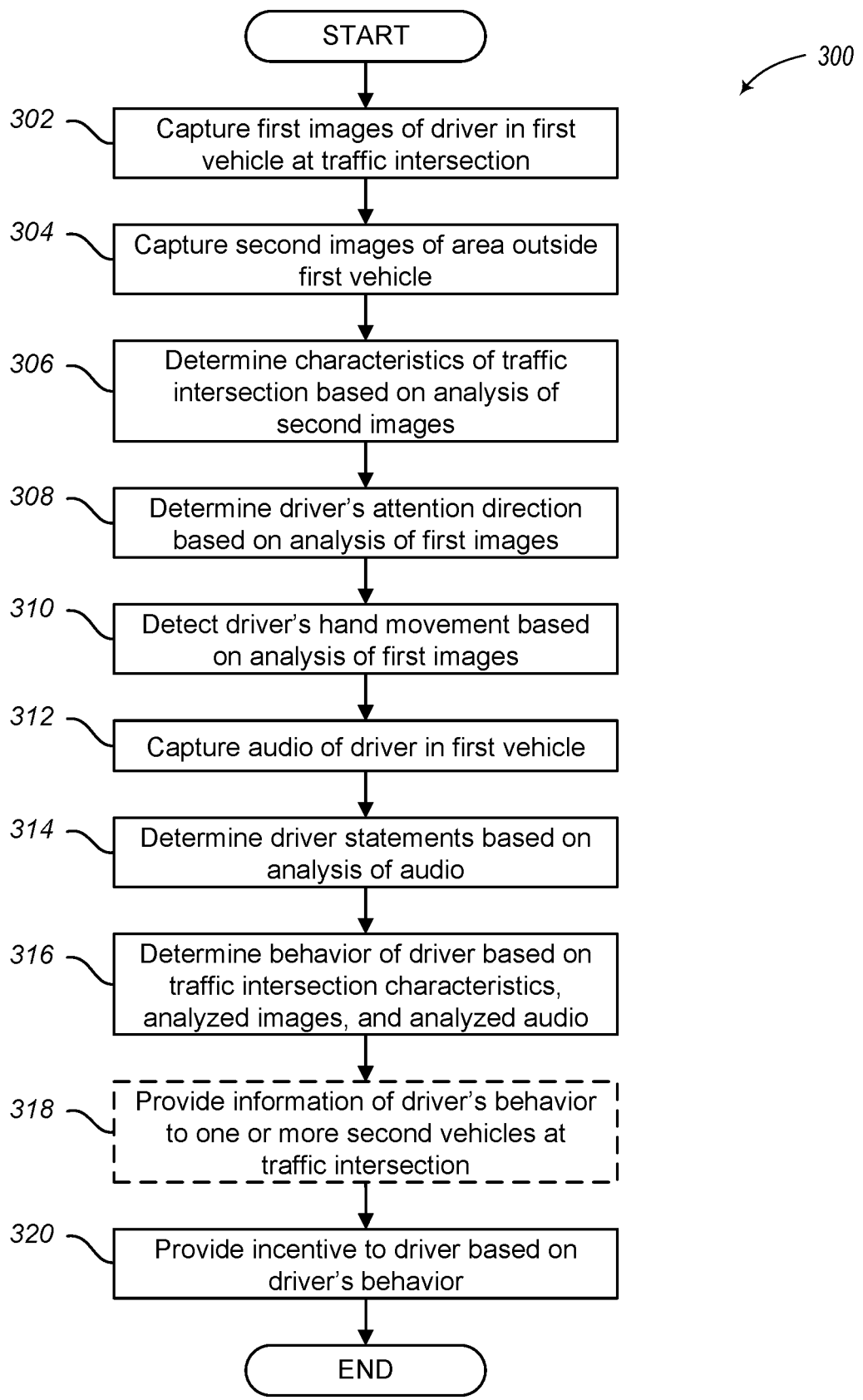
FIG. 3 illustrates a logical flow diagram showing one embodiment of a process for determining a driver's behavior at a traffic intersection based on images and audio of the driver and communicating that behavior to other vehicles at the traffic intersection in accordance with embodiments described herein.

FIG. 3 illustrates a logical flow diagram showing one embodiment of a process for determining a driver's behavior at a traffic intersection based on images and audio of the driver and communicating that behavior to other vehicles at the traffic intersection in accordance with embodiments described herein. Process 300 begins, after a start block, at block 302, where one or more first images of a driver in a first vehicle at a traffic intersection are captured. Utilization of "first" when referring to a "first vehicle" is used to distinguish one vehicle from another vehicle and does not indicate an order in which vehicles approach or arrive at a traffic intersection.

As described herein, one or more cameras may be facing the driver to capture the first images of the driver's eye position and movement, the driver's head position and movement, or hand gestures made by the driver. In some embodiments, the captured first images may include one or more image frames captured in response to the vehicle approaching a traffic intersection. In other embodiments, the captured first images may include a plurality of image frames that are captured in real time independent of the actual location of the vehicle.

Process 300 proceeds to block 304, where second images of an area outside of a first vehicle are captured. In various embodiments, these second images may be captured from a camera positioned to capture images in front of the first vehicle, such as the roadway the first vehicle is operating on. In other embodiments, these second images may be captured from a camera positioned to capture images behind or to the side of the vehicle, such as to capture an area where the vehicle may backup towards.

Process 300 continues at block 306, where one or more characteristics of the traffic intersection are determined. These characteristics may include, but are not limited to, whether the traffic intersection is a parking lot, a roundabout, or a normal intersection; whether there is a stop sign or traffic signal at the traffic intersection; the number of lanes and their turning designation (e.g., left turn only, right turn only, no turn on red, thru traffic only, etc.); or other information regarding the features of the traffic intersection. In various embodiments, one or more image processing techniques, artificial neural networks, or other learning algorithms may be utilized to analyze the exterior second images to identify known or defined characteristics. In various embodiments, one or more timing or distance thresholds may be used to determine when the first vehicle arrives at the traffic intersection.

In various embodiments, the characteristics of the traffic intersection may be determined or confirmed using other third-party information instead of or in addition to the analysis of the exterior images. For example, in some embodiments, a third-party map service may be queried using a GPS location of the vehicle for the characteristics of the traffic intersection. In at least one non-limiting example, the third-party map service may store information indicating which intersections are roundabouts or the number of turning lanes at the traffic intersection. This additional information can be used to further improve the determination of the one or more characteristics of the traffic intersection.

In yet other embodiments, information received from other vehicles approaching or at the traffic intersection may be used to further determine or confirm the characteristics of the traffic intersection. For example, as smart vehicle approach a traffic intersection they may be transmitting their GPS location and a unique identifier (and possibly other information, including current speed, current breaking, turn signal state, etc.). The driving-behavior-determination system can utilize this information to determine a number of spokes of the traffic intersection, how many vehicles are at the traffic intersection, a location of other vehicles in proximity, whether the traffic intersection is a roundabout, etc., which further improves the determination of the traffic intersection characteristics.

Process 300 proceeds to block 308, where the driver's attention direction is determined. In various embodiments, the captured first images are analyzed to identify where the driver is looking. In some embodiments, one or more image processing techniques are employed to identify a position of the driver's eyes relative to the driver's head, as well as a position of the driver's head relative to the front of the vehicle (which may be determined based on the driver's head position relative to the camera that captured the images of the driver). Moreover, the driver's eye movement or head movement may be determined by determining and comparing the driver's eye position or head position across multiple images over time. Collectively, the driver's eye position and movement or the driver's head position and movement, or some combination thereof indicate a general direction or area where the driver is looking, which may be referred to as the driver's attention direction.

As an example, the driving-behavior-determination system analyzes the driver's eye position and movement, as well as the driver's head position and movement, to determine if the driver is looking at a particular second vehicle at the traffic intersection, at a pedestrian walking near the traffic intersection, at the head unit in the first vehicle, at a rear-view mirror, etc.

Process 300 continues at block 310, where the driver's hand movement is detected. In various embodiments, the captured first images are analyzed to identify if and how the driver is moving his or her hands. In some embodiments, one or more image processing techniques are employed to identify a position and movement of the driver's hand or arm, or a combination thereof. For example, one or more artificial neural networks or learning algorithms may be utilized to detect gestures or hand movement in one image or across multiple images. In other embodiments, known hand movements may be compared to the driver's hand position in one or more images to detect the driver's current hand movement.

Process 300 proceeds next to block 312, where audio of the driver or interior of the first vehicle is captured when the first vehicle is at or approaching the traffic intersection (e.g., within a threshold distance or travel time from the traffic intersection). In various embodiments, one or more microphones within the first vehicle may be utilized to capture audio of the driver.

Process 300 continues next at block 314, where one or more statements of the driver are determined based on an analysis of the captured audio. These statements may be utilized to determine if the driver is talking to a second vehicle or its driver. For example, the driver may be verbally telling a second vehicle at the traffic intersection to proceed through the traffic intersection, even though the second vehicle cannot hear the driver. In various embodiments, the audio is analyzed to identify the words spoken by the driver of the first vehicle.

In some embodiments, other audio in the vehicle may also be identified.

For example, the "clicking" sound of an activated turn signal may also be detected to indicate that the driver is intending to turn at the traffic intersection, rather than drive straight through the traffic intersection.

Process 300 proceeds to block 316, where the behavior of the driver is determined based on the traffic intersection characteristics, the analyzed images, and the analyzed audio. This driving behavior is the driving behavior of the first vehicle on whether it is going to proceed through the traffic intersection or whether it will wait for a second vehicle to proceed through the traffic intersection. As used herein, proceeding through the traffic intersection includes any interaction of a vehicle with the traffic intersection, including turning left through the intersection, turning right through the intersection, proceeding straight through the intersection, etc. Moreover, the driving behavior may indicate that the behavior of the driver is unknown. In various embodiments, a confidence level may be provided to the driving behavior, which may be based on the combination of analyzed images and audio.

In various embodiments, the driver's attention direction determined at block 304 is utilized to determine if the driver is intending to communicate with a particular second vehicle at the traffic intersection. For example, if the driver is looking to the left, and there is a second vehicle to the left of the first vehicle (e.g., as determined based on an analysis of images of the traffic intersection), then the driver may be intending to communicate with the second vehicle. Conversely, if the driver is looking at the vehicle head unit, then the driver may not be communicating with the second vehicle.

The driver's hand movements detected at block 306 are compared to known hand movements or gestures to determine if and how the driver is intending to communicate with the second vehicle at the traffic intersection. Such hand movement may be a hand-waving gesture indicating that the second vehicle (e.g., another vehicle the driver of the first vehicle is looking at) should proceed through the traffic intersection. As another example, the gesture may be a pointing gesture indicating that the direction that the driver of the first vehicle intends to travel. In some embodiments, a database of known hand movements and the corresponding driver behavior is stored for comparison and matching with the detected hand movements.

In various embodiments, the audio of the driver captured at block 308 may be analyzed to determine the driver's behavior. In some embodiments, the audio may be compared to a known set of words or verbal commands that have known corresponding driver behavior. If there is a match with the known set of words, then the driver's verbal behavior can be obtained based on a known behavior that corresponds to the matched words. For example, the driver may say "you can go," which indicates that the driver is going to wait for the second vehicle to proceed through the traffic intersection. Alternative, the driver may say "it is my turn" to indicate that the driver is not going to wait for the second vehicle.

In various embodiments, a combination of the traffic intersection characteristics, the driver's attention direction, the driver's hand movement, and the driver's statements can be utilized to determine the first vehicle's driver's behavior at the traffic intersection. For example, even if the driver is looking at the head unit, the driver may be screaming for the second vehicle to "go already." In this example, the driver's statements may override the driver's attention direction. As another example, if the traffic intersection includes a thru lane and a right-turn-only lane and the second vehicle is in the thru lane, then the driver's intended communication may be directed at the second vehicle. But if the second vehicle is in the right-turn-only lane, then the driver's behavior may not be directed at the second vehicle.

In some embodiments, the driver or an administrator may assign one or more weights or thresholds for different types of driver behavior. For example, the audio behavior may be weighted higher than the driver's hand gestures. Moreover, the behavior may be further emphasized if the driver is looking at a particular second vehicle at the traffic intersection. As another example, different traffic intersection characteristics may be weighted based on the complexity or features of the traffic intersection.

Although block 316 is described as using the traffic intersection characteristics, analyzed images, and analyzed audio to determine the driver's behavior, embodiments are not so limited. For example, in some embodiments, the traffic intersection characteristics and movement of the vehicle are used to determine the driver's behavior. In other embodiments, the traffic intersection characteristics and the analyzed images are used to determine the driver's behavior. In yet other embodiments, the traffic intersection characteristics and the analyzed audio are used to determine the driver's behavior. Embodiments, however, are not so limited and other combinations of traffic intersection characteristics, analyzed images, or analyzed audio may be utilized to determine the driver's behavior.

Process 300 continues at block 318, where information of the driver's behavior is provided to one or more second vehicles at the traffic intersection. As mentioned above, the driver's behavior may be that the driver is intending to proceed through the traffic intersection, the driver is waiting, or the driver's behavior is unknown. In various embodiments, block 318 is optional and may not be performed.

In some embodiments, a display device within the first vehicle is utilized to present a visual representation of the information indicating the driver's behavior. For example, a green light may be illuminated to indicate that the second vehicle can proceed and the driver of the first vehicle will wait or a red light may be illuminated to indicate that the second vehicle is to wait for the first vehicle to proceed through the traffic intersection. As another example, the display device may present words or symbols that can be displayed to the second vehicles with information indicating the behavior of the first vehicle.

In other embodiments, a wireless communication message is transmitted from the driving-behavior-determination system with the driver's behavior information. In some embodiments, the wireless communication message may be transmitted via a suitable short-length radio transmission protocol. In at least one embodiment, the wireless communication message is broadcast without a specific computing device destination. In this way, any second vehicle at the traffic intersection that can receive the same short-length radio transmission protocol can receive the wireless communication message having the driver's behavior information. In other embodiments, the wireless communication message is transmitted to a specific second vehicle at the traffic intersection via a point-to-point wireless communication protocol. In some embodiments, the driving-behavior-determination system and the second vehicles at the traffic intersection may initially broadcast identification information such that the driving-behavior-determination system and the second vehicles can communicate driving behavior with particular vehicles. The second vehicle at the traffic intersection may be a smart vehicle, an autonomous vehicle, or even another driving-behavior-determination system positioned in the second vehicle.

The second vehicle that receives the transmitted message can then use the received information to perform actions. For example, if the message is received by another driving-behavior-determination system in the second vehicle then the other driving-behavior-determination system can display or present the driving behavior of the first driver of the first vehicle to a second driver of the second vehicle. Similarly, if the message is received by a smart vehicle, then the smart vehicle can display or present the driving behavior to a second driver of the smart vehicle. If the message is received by an autonomous vehicle, then the autonomous vehicle can proceed through the traffic intersection or wait as indicated by the driving behavior identified in the information in the transmitted message.

Process 300 proceeds next to block 320, where an incentive is provided to the driver based on the driver's behavior. The incentive may be a positive incentive (e.g., something the driver wants or is beneficial to the driver) or a negative incentive (e.g., points against a driving record, insurance adjustments, fines, or other thing detrimental to the driver). In some embodiments, the incentive may be provided to a driver of another vehicle. Additional details for providing an incentive to a driver are described in more detail below in conjunction with FIG. 5.

After block 320, process 300 terminates or returns to a calling process to perform other actions.

In some embodiments, process 300 may loop (not illustrated) to block 302 to continue to capture images of the driver in the vehicle and the area outside the vehicle, determine the driver's behavior and provide information on the driver's behavior to other vehicles. This process may continually analyze images of the driver or it may analyze images of the driver when the vehicle approaches or arrives at a traffic intersection. Moreover, although embodiments described above utilize both images and audio to determine the driver's behavior, embodiments are not so limited. In other embodiments, only the images may be analyzed to determine the driver's behavior and blocks 312 and 314 may be optional and may not be performed, and process 300 may proceed from block 310 to block 316. In yet other embodiments, only the audio may be analyzed to determine the driver's behavior.

Embodiments described above analyze images and audio to determine the driving behavior of the driver. In other embodiments, additional information or environmental factors can also be used to determine the driving behavior, such as a smoke level in the vehicle, presence of alcohol smell in vehicle or a blood alcohol level of the driver (e.g., via a breathalyzer device), ambient noise inside the vehicle (e.g., music, cell phone distractions, talking passengers, etc.), ambient noise outside the vehicle (e.g., emergency sirens, vehicle noise, pedestrian noise, etc.), a number passengers inside the vehicle, presence of a cell phone inside the vehicle, headphones being worn by the driver, etc. One or more of these additional environmental factors can be used alone or in addition to the hand movement, head movement, or eye movement to determine the driving behavior of the driver.

Moreover, in some embodiments, the behavior of the driver or other information associated with the vehicle may be provided to other entities. For example, in some embodiments, the driving behavior may indicate that the driver is going to wait, but additional sensors collect information that suggests that the driver proceeded through the traffic intersection anyways (e.g., an accelerometer that captures driving movement within a threshold time from when the driving behavior was determined). This type of behavior may indicate that the driver is driving aggressively or erratically, especially if repeated over a short timeframe. If the driver repeats this aggressive driving at a select number of traffic intersections within a threshold amount of time, then a second message may be transmitted via a cellular network to the proper authorities to indicate that the driver is driving in an aggressive or erratic manner. As another example, where a blood alcohol level of the driver is determined and is above a threshold amount, a second message may be transmitted via the cellular network to the proper authorities indicating that the driver may be operating the vehicle impaired. Accordingly, in various embodiments, the vehicle may transmit or communicate special information about illegal or possibly illegal activity inside or associated with the vehicle to the authorities.

Although some embodiments and examples are described herein as suggesting that the traffic intersection is a road intersection, embodiments are not so limited. In some embodiments, the traffic intersection may be a parking lot or other physical location where vehicles may intersect one another such that a human can communicate with another vehicle. By employing embodiments described herein, images of the driver can be used to determine the driving behavior of the driver such that other vehicles are notified of the driving behavior. For example, if the vehicle is positioned in a parking space and the driver begins to turns his head to check his mirrors or to look behind him, then the driver may be intending to exit the parking space and enter the aisle of the parking lot. With this determined driving behavior, the driving-behavior-determination system can notify other driving-behavior-determination systems, smart vehicles, or autonomous vehicles that are nearby that the vehicle is about to or has started to exit the parking space. In other embodiments, the traffic intersection may be any road, highway, freeway interchange, or driving scenario where vehicles are in proximity to one another and may interact with one another. For example, if a human driver cuts off a threshold number of autonomous vehicles on a highway within a select period of time, and those actions cause the autonomous vehicles to react, a negative incentive may be provided to the driver (e.g., by sending a poor performance review to the driver's insurance company).

In various embodiments, the driver may be enabled to define or record actions by the driver to indicate specific driving behavior. For example, the driver can record images of the driver holding a "thumbs up" and indicate that this gesture indicates that the driver intends that the second vehicle is to proceed through the traffic intersection. The system can then use this stored action to determine the driving behavior at block 316.

In other embodiments, historical data can be analyzed and processed to better predict the driver's behavior, such as by learning the driver's behavior depending on the time of day, whether there are other people in the vehicle, etc. In some other embodiments, one or more other sensors may be used to determine how the driver of the first vehicle acted after the driving behavior is provided to the second vehicle. For example, an accelerometer can be utilized to determine if the driver proceeded through the intersection in accordance with the determined driving behavior. This information can be utilized to provide additional data points that indicate a confidence level of future determinations of driving behavior. For example, if the driver waved at the second vehicle but immediately proceeded through the traffic intersection, then a future confidence level of a "wave" indicating that the driver intends to wait may be lowered.

Figure 4:
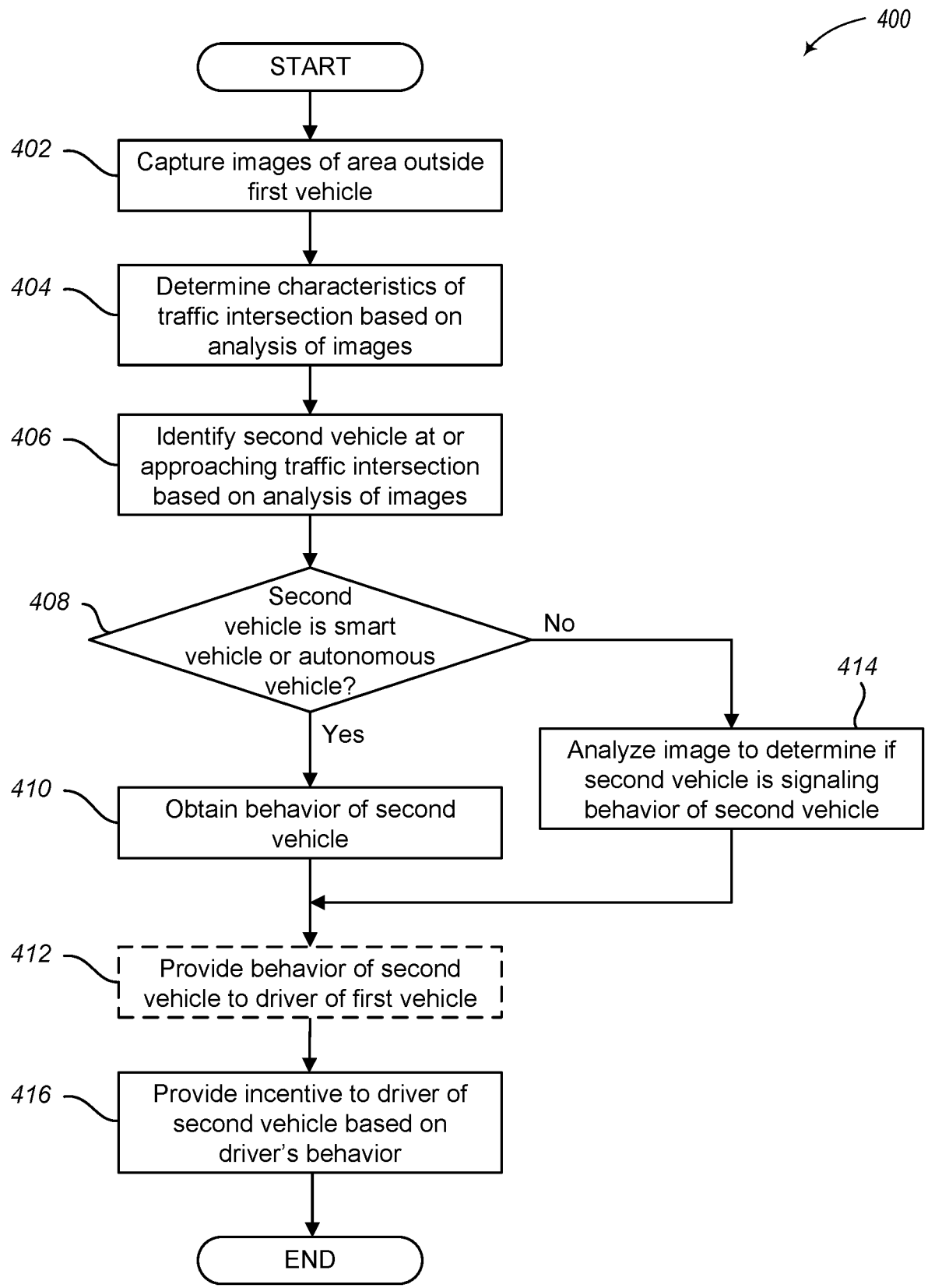
FIG. 4 illustrates a logical flow diagram showing one embodiment of a process for determining a driving behavior of another vehicle at a traffic intersection and presenting that behavior to the driver in accordance with embodiments described herein.

FIG. 4 illustrates a logical flow diagram showing one embodiment of a process for determining a driving behavior of another vehicle at a traffic intersection and presenting that behavior to the driver in accordance with embodiments described herein. Process 400 begins, after a start block, at block 402, where images of an area outside of a first vehicle are captured. In various embodiments, block 402 may employ embodiments similar to block 304 in FIG. 3 to capture external images.

Process 400 proceeds to block 404, where one or more characteristics of the traffic intersection are determined. In various embodiments, block 404 may employ embodiments similar to block 306 in FIG. 3 to determine traffic intersection characteristics.

Process 400 continues at block 406, where a second vehicle at or approaching the traffic intersection is identified. In various embodiments, the captured images are analyzed using one or more image processing techniques to identify a make and model of the vehicle. Although embodiments described herein imply use by cars, trucks, or other automobiles, embodiments are not so limited. For example, embodiments described herein may be utilized to determine the behavior of a person driving a boat in a marina and provide that behavior to other boats.

Process 400 proceeds next at decision block 408, where a determination is made whether the second vehicle is a smart vehicle or autonomous vehicle. In some embodiments, a list of known smart car or autonomous makes and models may be maintained. If the identified make and model are in the known list, then the second vehicle is a smart vehicle or autonomous vehicle. In some embodiments, the second vehicle may be considered a smart vehicle for purposes of obtaining driver behavior if the second vehicle includes a driving-behavior-determination system itself that transmits wireless communication messages having the second vehicle's driver's driving behavior. If the second vehicle is a smart vehicle or autonomous vehicle, process 400 flows to block 410; otherwise, process 400 flows to block 414.

At block 410, the first vehicle obtains the behavior of the second vehicle. In some embodiments, the smart vehicle or autonomous vehicle (or even a driving-behavior-determination system in the second vehicle) is transmitting its own driving behavior (e.g., via broadcast transmission or point-to-point transmissions). Similar to the driving behavior determined at block 316 in FIG. 3, the driving behavior of the second vehicle may indicate whether the second vehicle is proceeding through the traffic intersection or if the second vehicle is waiting for the first vehicle to proceed through the intersection. In some embodiments, the behavior of the second vehicle is obtained by receiving a wireless communication message that includes information regarding the driving behavior of the second vehicle. After block 410, process 400 proceeds to block 412.

If, at decision block 408, the second vehicle is not a smart vehicle or autonomous vehicle, process 400 flows from decision block 408 to block 414. At block 414, the images captured at block 402 are analyzed to determine if the second vehicle is signaling behavior of the second vehicle. For example, the second vehicle may have a turn signal engaged to indicate that the second vehicle is turning. In other embodiments, the second vehicle may include a driving-behavior-determination system that includes a display device that is presenting visual information. This visual information can be identified in the captured images using one or more image processing techniques. After block 414, process 400 flows from block 414 to block 412.

At block 412, the behavior of the second vehicle is provided to the driver of the first vehicle. In some embodiments, the driving-behavior-determination system includes a display device that displays visual information to the driver, such as via red or green indicators or other graphical information. In other embodiments, the driving behavior may be presented to the driver via an audio output device. In some embodiments, block 412 may be optional and may not be performed.

Process 400 proceeds to block 416, where an incentive is provided to the driver of the second vehicle based on the driver's behavior. The incentive may be a positive incentive (e.g., something the driver wants or is beneficial to the driver) or a negative incentive (e.g., points against a driving record, insurance adjustments, fines, or other thing detrimental to the driver). Additional details for providing an incentive to a driver are described in more detail below in conjunction with FIG. 5.

After block 416, process 400 terminates or otherwise returns to a calling process to perform other actions. In some embodiments, process 400 may loop (not illustrated) to block 402 to continue to capture images of the area outside the first vehicle, determine the characteristics of the traffic intersection, and obtain the driving behavior of a second vehicle. This process may continually analyze images of a traffic intersection when the vehicle approaches or arrives at the traffic intersection.

Figure 5:
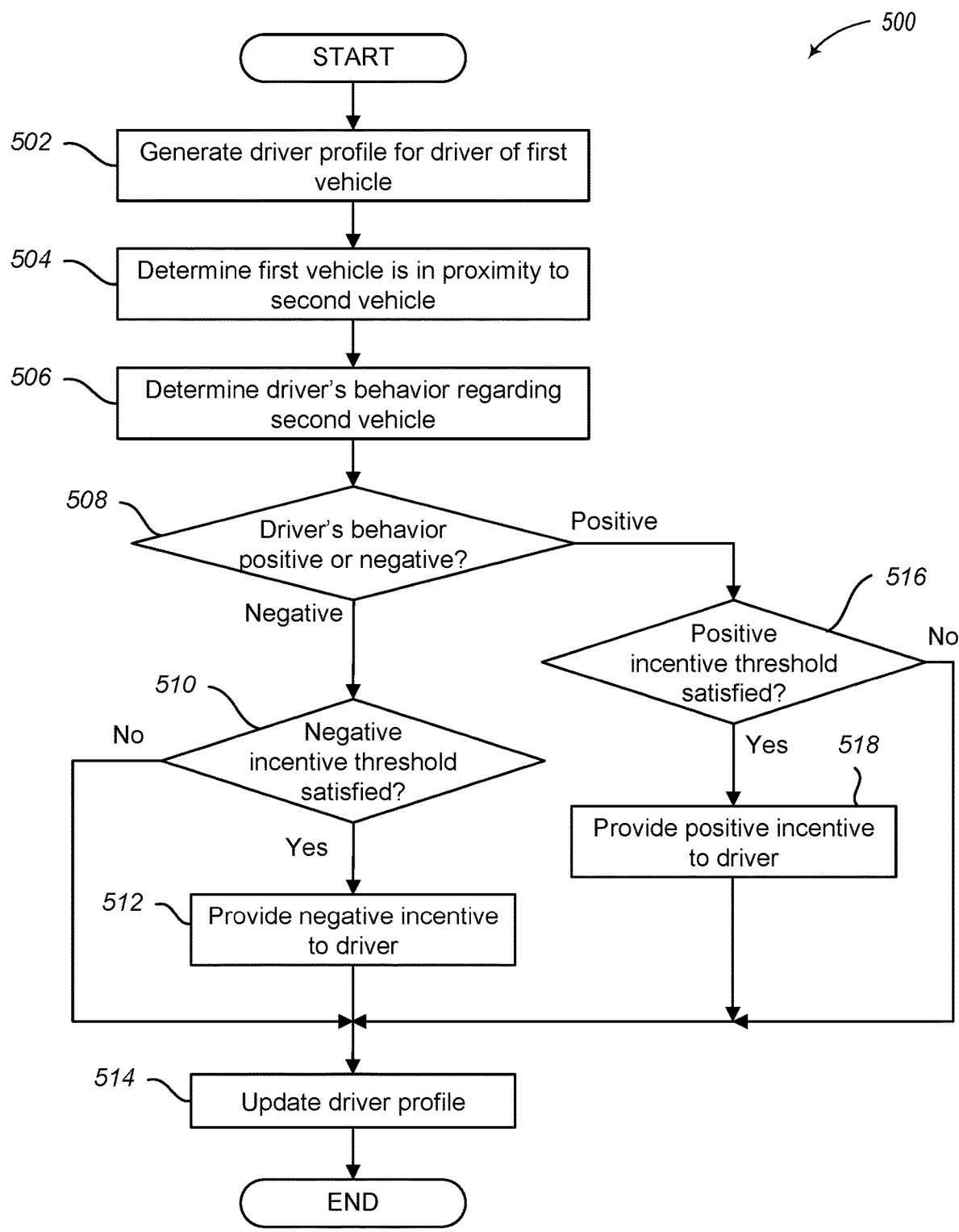
FIG. 5 illustrates a logical flow diagram showing one embodiment of a process for providing an incentive to a driver of a vehicle based on the driving behavior of the driver relative to another vehicle in accordance with embodiments described herein.

FIG. 5 illustrates a logical flow diagram showing one embodiment of a process for providing an incentive to a driver of a vehicle based on the driving behavior of the driver relative to another vehicle in accordance with embodiments described herein. Process 500 begins, after a start block, at block 502, where a driver profile for a driver of a first vehicle is generated.

In various embodiments, the driver profile include biographic information about the driver (e.g., age, gender, residency, etc.), driving experience (e.g., years of driving, types of vehicles driven, etc.), driving habits (e.g., number or type of tickets, number or type of accidents, driving style, etc.), or other information about the driver and their driving. The driver profile may also include information regarding select positive or negative incentives. For example, the driver profile may list the types of positive incentives that the driver would like to receive, such as music, coupons, insurance discounts, service credits, gifts, etc. In some embodiments, the driver profile may indicate whether the positive incentives received by the driver can be forwarded to others as positive incentives. Likewise, the driver profile may identify negative incentives available to the driver, e.g., insurance premium adjustments, fines, positive incentives that can be revoked, etc.

Process 500 proceeds to block 504, where a determination is made that the first vehicle is in proximity to a second vehicle. In various embodiments, the second vehicle may be identified by employing embodiments described herein to capture images of an area outside of the first vehicle and analyze the images to determine characteristics of a traffic intersection, including identifying and locating the second vehicle, such as described above in conjunction with block 306 in FIG. 3.

Process 500 continues at block 506, where the behavior of the driver of the first vehicle regarding the second vehicle is determined. Determining the driver's behavior is described elsewhere herein, including at block 316 in FIG. 3. Briefly, however, the driver's behavior may be positive or negative towards the second vehicle. Examples of positive behaviors may include, but are not limited to, the driver gesturing toward the second vehicle to proceed, the driver is taking an alternate route from the second vehicle after the second vehicle declared an emergency, the driver is allowing the second vehicle to have the right of way, the driver is using appropriate turn signals or lane following distances, or other behaviors that indicate the driver is operating the first vehicle in a safe manner relative to the second vehicle. Examples of negative behaviors may include, but are not limited to, the driver cutting off the second vehicle, the driver toying with the second vehicle (e.g., forcing an autonomous vehicle to take evasive procedures to avoid a collision), the driver providing false or inaccurate gestures to the second vehicle, the driver providing profane gestures to the second vehicle, or other behaviors that indicate the driver is operating the first vehicle in an unsafe manner relative to the second vehicle.

Process 500 proceeds next to decision block 508, where a determination is made whether the driver's behavior is positive or negative. If the driver's behavior is positive, process 500 flows to decision block 516; otherwise, process 500 flows to decision block 510.

At decision block 510, a determination is made whether a negative incentive threshold is satisfied. In various embodiments, one or more negative incentive thresholds are maintained for each of one or more different types of negative behaviors. For example, cutting other vehicles off may have one negative incentive threshold, toying with autonomous vehicles may have another negative incentive threshold, and providing false gestures to other drives may have yet another negative incentive threshold.

In some embodiments, a negative incentive threshold may be a numeric value of the number of times the driver has performed the negative behavior in a select time period. For example, one negative incentive threshold may be that the driver has cut off four other vehicles in the past 10 minutes. In other embodiments, a negative incentive threshold may be a numeric value or level of severity of the negative behavior. For example, the negative incentive threshold may be that the driver cuts a vehicle off within two feet of the vehicle's bumper.

In other embodiments, the negative incentive threshold may be a combination of multiple different negative incentive thresholds for multiple different behaviors. For example, a negative incentive threshold may be that a driver has cut off two vehicles in the past two minutes and has two previous driving-under-the-influence tickets. In some embodiments, different negative behaviors and the corresponding negative incentive thresholds may be weighted differently.

These examples negative incentive thresholds are for illustrative purposes and other negative incentive thresholds or combinations of thresholds or combinations of negative behaviors may be utilized.

In some embodiments, determination of whether the negative incentive threshold is satisfied may include a comparison between the current negative behavior and the negative incentive threshold that corresponds to the same type of behavior. In other embodiments, the driver's profile may be accessed to determine whether the driver has previously performed the negative behavior, and whether a combination of the current negative behavior and the driver's previous negative behavior satisfies the negative incentive. If the negative incentive threshold is satisfied, then process 500 flows to block 512; otherwise, process 500 flows to block 514.

At block 512, a negative incentive is provided to the driver. In some embodiments, providing the negative incentive to the driver includes providing information regarding the negative behavior to a third party, such as an insurance company, law enforcement, parents of the driver, employer of the driver, etc. In other embodiments, providing the negative incentive to the driver may include deducting or removing positive incentives previously received at block 518.

In some embodiments, the negative incentive may be selected based on a geographic location of the vehicles. In some embodiments, the location may be a particular geographic location, such as a particular distance from a given location, zip code, city boundary, county boundary, a selected geo-fence boundary, etc. In other embodiments, the location may be based on the type of roadway where the negative incentive was identified, such as a highway, parking lot, four-way stop, etc. For example, if the driver had previously received a coupon for a pizza restaurant that is within a threshold distance from the current location and a coupon for a gas station that is outside the threshold distance from the current location of the vehicles, then the pizza restaurant coupon may be removed from the driver as the negative incentive.

After block 512, process 500 proceeds to block 514.

If, at decision block 508, the driver's behavior is positive, process 500 flows from decision block 508 to decision block 516. At decision block 516, a determination is made whether a positive incentive threshold is satisfied. In various embodiments, one or more positive incentive thresholds are maintained for each of one or more different types of positive behaviors. For example, giving right of way to a delivery truck may have one positive incentive threshold, using proper turn signals may have another positive incentive threshold, and providing positive gestures and right of way to autonomous vehicles may have yet another positive incentive threshold.

In some embodiments, a positive incentive threshold may be a numeric value of the number of times the driver has performed the positive behavior in a select time period. For example, one positive incentive threshold may be that the driver has given a delivery driver the right of way 50 times. In other embodiments, a positive incentive threshold may be a numeric value or level of positivity of the positive behavior. For example, the positive incentive threshold may be that the driver altered their route to a destination to avoid a vehicle that has declared an emergency (rather than staying on the same route and only giving a right of way).

In other embodiments, the positive incentive threshold may be a combination of multiple different positive incentive thresholds for multiple different behaviors. For example, a positive incentive threshold may be that a driver has given right of way to five vehicles in the last week and has no previous driving-under-the-influence tickets. In some embodiments, different positive behaviors and the corresponding positive incentive thresholds may be weighted differently.

These examples positive incentive thresholds are for illustrative purposes and other positive incentive thresholds or combinations of thresholds or combinations of positive behaviors may be utilized.

In some embodiments, determination of whether the positive incentive threshold is satisfied may include a comparison between the current positive behavior and the positive incentive threshold that corresponds to the same type of behavior. In other embodiments, the driver's profile may be accessed to determine whether the driver has previously performed the positive behavior, and whether a combination of the current positive behavior and the driver's previous positive behavior satisfies the positive incentive. If the positive incentive threshold is satisfied, then process 500 flows to block 518; otherwise, process 500 flows to block 514.

At block 518, a positive incentive is provided to the driver. In some embodiments, providing the positive incentive to the driver includes providing information regarding the positive behavior to a third party, such as an insurance company, employer of the driver, the second vehicle, etc. In other embodiments, providing the positive incentive to the driver may include displaying, emailing, texting, or otherwise delivering a coupon to the driver; giving the driver access to a song or other audiovisual content; provide a gift to the driver's home or to the first vehicle at a select location or to the first vehicle while driving (e.g., via a drone); providing traffic information; donating to a charity; etc. After block 518, process 500 proceeds to block 514.

In some embodiments, the first vehicle communicates with the second vehicle to obtain the positive incentive from the second vehicle prior to providing the positive incentive to the driver. For example, assume the second vehicle is a mobile dog grooming company. The driver profile of the second vehicle may indicate that it will give out a 25% off dog grooming coupon as a positive incentive. The first vehicle transmits a message to the second vehicle indicating that the driver of the first vehicle satisfied the positive incentive threshold. The second vehicle responds by transmitting the 25% off coupon to the driver or to the first vehicle to be provided to the driver.

In other embodiments, the second vehicle may determine that the driver of the first vehicle is to receive the positive incentive and communicate that positive incentive to the driver of the first vehicle.

The positive incentive may be selected by the driver, selected based on the profile, selected based on a location of the vehicles, or some combination thereof. Likewise, delivery of a positive incentive may be based on a location of the first and second vehicles (or related vehicles). In some embodiments, the location may be a particular geographic location, such as a particular distance from a given location, zip code, city boundary, county boundary, a selected geofence boundary, etc. In other embodiments, the location may be based on the type of roadway where the positive incentive was identified, such as a highway, parking lot, four-way stop, etc. For example, if the second vehicle is an autonomous delivery vehicle and it is carrying cellphone charging cables and sports memorabilia to provide as positive incentives, then a sports memorabilia may be selected and delivered to the first vehicle if they are both located in a parking lot within a threshold distance from the sports team's stadium. Alternatively, if both vehicles are in a parking lot outside that threshold distance, then a cellphone charging cable may be selected and delivered to the driver of the first vehicle. Conversely, if the vehicles are traveling down the highway, then the second vehicle may provide an electronic coupon to the driver of the first vehicle because it would be unsafe to transfer a product to the first vehicle. In this example, the location of the vehicles could be used to select the type of coupon (e.g., for a pizza restaurant in proximity to the vehicles). As another example, if a third vehicle is owned by the same company as the second vehicle and it is within a threshold distance from the home of the driver of the first vehicle, then the third vehicle may deliver a gift to the driver's home.

As mentioned above, the second vehicle may not currently have a positive incentive to provide to the driver of the first vehicle. In at least one such embodiment, the vehicles may exchange information indicating that a positive incentive should have been provided to the driver of the first vehicle. At a later time or date, when the first and second vehicles come into proximity to one another, if the second vehicle now has a positive incentive to provide to the driver of the first vehicle, then the second vehicle provides the positive incentive as described herein. In some embodiments, this future encounter may occur at the same location or within a threshold distance from where the original encounter occurred that resulted in the positive incentive. In other embodiments, the future encounter may occur at some other location.

At block 514, the driver's profile is updated. Updating the driver's profile may include storing the type or severity of the driver's behavior, whether the behavior was positive or negative, and whether an incentive was provided to the driver.

After block 514, process 500 terminates or returns to a calling process to perform other actions. In some embodiments, process 500 may loop (not illustrated) to block 504 to continue to monitor an area outside the first vehicle to determine when it is in proximity to a second vehicle, determine the driver's behavior, and provide positive or negative incentives.

Although embodiments are described herein with respect to vehicles, embodiments are not so limited. In some other situations, embodiments described herein may be utilized by robots and their interactions with humans. For example, a home improvement store may utilize autonomous robots to travel through the store to track inventory or to provide help to customers. When the autonomous robot approaches an aisle intersection at the same time as a person, the robot can capture images of the person. These images are analyzed to determine if the person is gesturing for the robot to proceed through the aisle intersection while the person waits. Conversely, the robot may determine that it is to wait for the person to proceed through the aisle intersection and may provide a visual or audio indication to tell the person to proceed. If the robot determines that the person's behavior was a positive behavior, then the robot can give the person a positive incentive (e.g., a coupon, pre-release information on new products, etc.).

Figure 6:
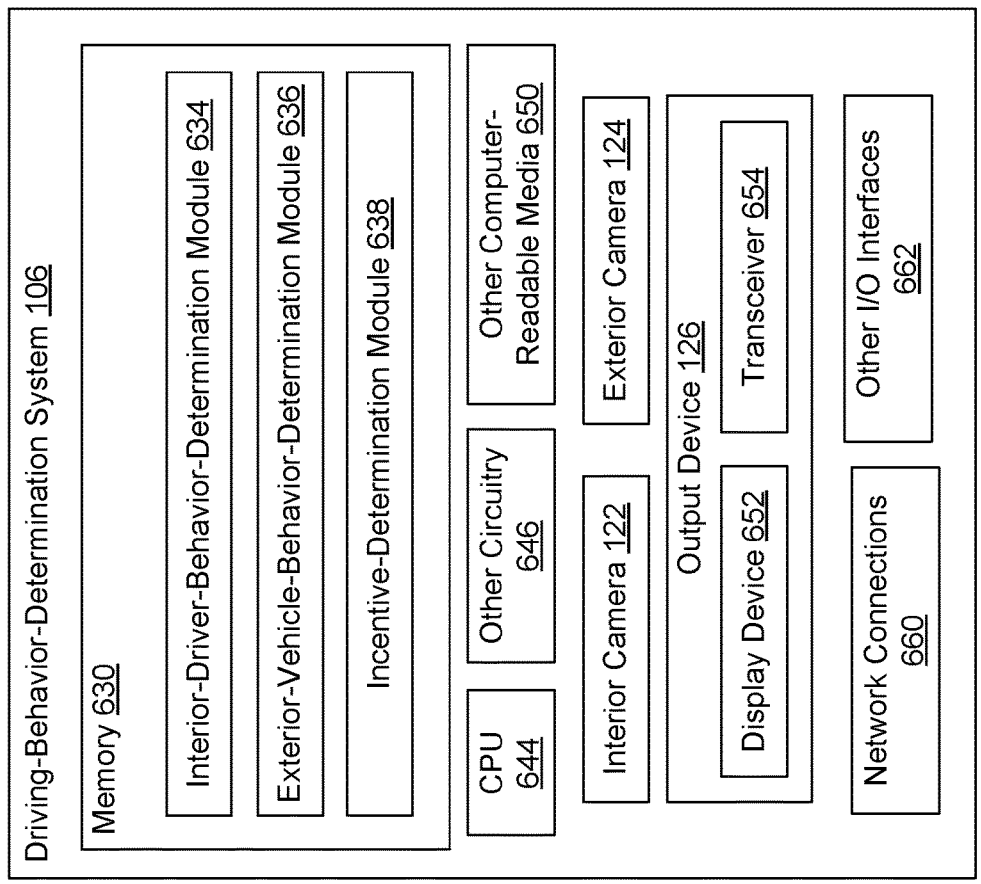
FIG. 6 shows a system diagram that describe various implementations of computing systems for implementing embodiments described herein.

FIG. 6 shows a system diagram that describes one implementation of computing systems for implementing embodiments described herein. System 600 includes driving-behavior-determination system 106.

Driving-behavior-determination system 106 captures images, determines driving behavior of the driver or of other vehicles, provides incentives to the driver based on the driving behavior, and optionally provides the driving behavior to other vehicles or to the driver. One or more special-purpose computing systems may be used to implement driving-behavior-determination system 106. Accordingly, various embodiments described herein may be implemented in software, hardware, firmware, or in some combination thereof. The driving-behavior-determination system 106 may include memory 630, one or more central processing units (CPUs) 644, other circuitry 646, other computer-readable media 650, interior camera 122, exterior camera 124, output device 126, network connections 660, and I/O interfaces 662.

Memory 630 may include one or more various types of non-volatile and/or volatile storage technologies. Examples of memory 630 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 630 may be utilized to store information, including computer-readable instructions that are utilized by CPU 644 to perform actions, including embodiments described herein.

Memory 630 may have stored thereon interior-driver-behavior-determination module 634, exterior-vehicle-behavior-determination module 636, and incentive-determination module 638. The interior-driver-behavior-determination module 634 may employ embodiments described herein to obtain images captured by interior camera 122, determine the driver's attention direction and hand movement, determine the driving behavior of the driver, and provide the driving behavior to other vehicles via output device 126. The interior-driver-behavior-determination module 634 may also obtain images from exterior camera 124 to analyze and determine characteristics of an area outside the vehicle. The exterior-vehicle-behavior-determination module 636 may employ embodiments described herein to obtain images captured by exterior camera 124, obtain the behavior of other vehicles, and provide the driving behavior to the driver via output device 126. The incentive-determination module 638 may employ embodiments described herein to utilize the driving behavior to select and provide positive or negative incentives to the driver.

The other circuitry 646 may include application-specific integrated circuits (ASICs), digital signal processors, discrete circuitry, logic gates, standard integrated circuits, controllers (e.g., by executing appropriate computing instructions, and including microcontrollers or embedded controllers), field-programmable gate arrays (FPGAs), complex programmable logic devices (CPLDs), etc., that can employ embodiments described herein.

Other computer-readable media 650 may include other types of stationary or removable computer-readable media, such as removable flash drives, external hard drives, or the like.

Interior camera 122 includes one or more cameras that are configured to capture images of the driver of a vehicle. Exterior camera 124 includes one or more cameras that are configured to capture images of an area outside the vehicle.

Output device 126 includes display device 652 or transceiver 654. The display device 652 includes one or more display devices that are configured to present driving behavior information to other vehicles or to a driver. The display device 652 may include one or more LCD screens, LEDs or other lights, or other types of display devices. The transceiver 654 is configured to communicate with other computing devices, including other driving-behavior-determination systems, autonomous vehicles, smart vehicles, etc., to provide driving behavior information or to receive driving behavior information from other vehicles or to provide or receive incentives from other vehicles. Other I/O interfaces 662 may include input buttons, audio interfaces, video interfaces, network interfaces, or the like.

The system further includes a wireless transceiver 654 and the circuitry is further configured to provide, via the wireless transceiver 654, the previous driving patterns in the profile to the other vehicle. Further, the circuitry selects and provides the positive incentive to the driver by being further configured to, receive, via the wireless transceiver 654, audiovisual content from the other vehicle in response to the driving behavior satisfying the positive incentive threshold. In addition, the circuitry selects and provides the negative incentive to the driver by being further configured to, provide, via the wireless transceiver 654, a wireless message to a third party indicating that the driving behavior satisfied the negative incentive threshold. The circuitry is further configured to receive, via the wireless transceiver 654, an indication of expected driving behavior of the other vehicle; and determine that the driving behavior of the driver satisfies the positive incentive threshold in response to the driver yielding to the expected driving behavior of the other vehicle. Moreover, the circuitry is further configured to receive, via the wireless transceiver 654, an indication of expected driving behavior of the other vehicle; and determine that the driving behavior of the driver satisfies the negative incentive threshold in response to the driver failing to yield to the expected driving behavior of the other vehicle.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a first camera that captures first images of a driver of a vehicle;
a second camera that captures second images of an area outside of the vehicle; and
circuitry configured to:
capture, via the first camera, one or more first images of the driver of the vehicle;
capture, via the second camera, one or more second images of the area outside of the vehicle;
identify another vehicle in proximity to the vehicle based on an analysis of the one or more second images;
determine a driving behavior of the driver based on an analysis of the one or more first images;
determine a geographic location of the vehicle;
obtain a positive incentive threshold and a negative incentive threshold from a database based on the geographic location of the vehicle;
determine if the driving behavior satisfies the positive incentive threshold or the negative incentive threshold;
in response to the driving behavior satisfying the positive incentive threshold, obtain a positive incentive from the other vehicle based on the geographic location and provide the positive incentive to the driver; and
in response to the driving behavior satisfying the negative incentive threshold, select and provide a negative incentive to the driver.

2. The system of claim 1, wherein the circuitry determines the driving behavior of the driver by being further configured to:
determine an attention direction of the driver based on an analysis of the one or more first images for head movement and eye position;
detect hand movement of the driver based on an analysis of the one or more first images; and
determine the driving behavior of the driver based on the head movement, eye position, and hand movement.

3. The system of claim 1, further comprising:
a memory that stores a profile of previous driving patterns of the driver; and
wherein the circuitry determines if the driving behavior satisfies the positive incentive threshold or the negative incentive threshold by being further configured to:
update the previous driving patterns in the profile based on the driving behavior; and
determine if the updated profile indicates that the driver has satisfied the positive incentive threshold or the negative incentive threshold over time.

4. The system of claim 3, further comprising:
a wireless transceiver;

wherein the circuitry is further configured to provide, via the wireless transceiver, the previous driving patterns in the profile to the other vehicle.

5. The system of claim 1, further comprising:
a wireless transceiver;
wherein the circuitry selects and provides the positive incentive to the driver by being further configured to, receive, via the wireless transceiver, audiovisual content from the other vehicle in response to the driving behavior satisfying the positive incentive threshold.

6. The system of claim 1, further comprising:
a wireless transceiver;
wherein the circuitry selects and provides the negative incentive to the driver by being further configured to, provide, via the wireless transceiver, a wireless message to a third party indicating that the driving behavior satisfied the negative incentive threshold.

7. The system of claim 1, further comprising:
a wireless transceiver;
wherein the circuitry is further configured to:
receive, via the wireless transceiver, an indication of expected driving behavior of the other vehicle; and
determine that the driving behavior of the driver satisfies the positive incentive threshold in response to the driver yielding to the expected driving behavior of the other vehicle.

8. The system of claim 1, further comprising:
a wireless transceiver;
wherein the circuitry is further configured to:
receive, via the wireless transceiver, an indication of expected driving behavior of the other vehicle; and
determine that the driving behavior of the driver satisfies the negative incentive threshold in response to the driver failing to yield to the expected driving behavior of the other vehicle.

9. The system of claim 1, wherein the circuitry is further configured to:
determine the positive incentive threshold and the negative incentive threshold based on a learning analysis of the one or more second images over time.

10. The system of claim 1, wherein the circuitry obtains the positive incentive by being further configured to:
determine that no positive incentive is available at a first time when the driving behavior satisfies the positive incentive threshold;
store information identifying the other vehicle and the satisfied positive incentive threshold;
determine that the vehicle and the other vehicle are in proximity to each other at a second time when the positive incentive is available; and
obtain the positive incentive from the other vehicle.

11. The system of claim 1, wherein the circuitry determines the driving behavior by being further configured to:
determine an attention direction of the driver based on an analysis of the one or more first images for head movement and eye position;
detect hand movement of the driver based on an analysis of the one or more first images; and
determine a driving behavior of the driver based on the head movement, eye position, and hand movement.

12. A method, comprising:
capturing one or more first images of a driver of a vehicle;
capturing one or more second images of an area outside of the vehicle;
identifying another vehicle in proximity to the vehicle based on an analysis of the one or more second images;
determining a driving behavior of the driver based on an analysis of the one or more first images;
determining a geographic location of the vehicle;
obtaining a positive incentive threshold and a negative incentive threshold from a database based on the geographic location of the vehicle;
determining if the driving behavior satisfies the positive incentive threshold or the negative incentive threshold;
in response to the driving behavior satisfying the positive incentive threshold, obtaining a positive incentive from the other vehicle and providing the positive incentive to the driver; and
in response to the driving behavior satisfying the negative incentive threshold, selecting and providing a negative incentive to the driver.

13. The method of claim 12, further comprising:
storing a profile of previous driving patterns of the driver;
wherein determining if the driving behavior satisfies the positive incentive threshold or the negative incentive threshold includes:
updating the previous driving patterns in the profile based on the driving behavior; and
determining if the updated profile indicates that the driver has satisfied the positive incentive threshold or the negative incentive threshold over time.

14. The method of claim 13, further comprising:
providing the previous driving patterns in the profile to the other vehicle.

15. The method of claim 12, wherein obtaining the positive incentive from the other vehicle further comprises:
receiving audiovisual content from the other vehicle in response to the driving behavior satisfying the positive incentive threshold.

16. The method of claim 12, wherein selecting and providing the negative incentive to the driver further comprises:
providing a wireless message to a third party indicating that the driving behavior satisfied the negative incentive threshold.

17. The method of claim 12, further comprising:
receiving an indication of expected driving behavior of the other vehicle; and
determining that the driving behavior of the driver satisfies the positive incentive threshold in response to the driver yielding to the expected driving behavior of the other vehicle.

18. The method of claim 12, further comprising:
receiving an indication of expected driving behavior of the other vehicle; and
determining that the driving behavior of the driver satisfies the negative incentive threshold in response to the driver failing to yield to the expected driving behavior of the other vehicle.

19. A non-transitory processor-readable storage medium that stores computer instructions that, when executed by a processor, cause the processor to perform actions, the actions comprising:
capturing, via a first camera, one or more first images of a driver of a vehicle;
capturing, via a second camera, one or more second images of an area outside of the vehicle;
identifying another vehicle in proximity to the vehicle based on an analysis of the one or more second images;
determining a driving behavior of the driver based on an analysis of the one or more first images;
determining a geographic location of the vehicle;

obtaining a positive incentive threshold based on the geographic location of the vehicle;

determining if the driving behavior satisfies the positive incentive threshold;

in response to the driving behavior satisfying the positive incentive threshold, obtaining a positive incentive from the other vehicle based on the geographic location and providing the positive incentive to the driver.

\* \* \* \* \*